(12) United States Patent
Arnold et al.

(10) Patent No.: US 10,515,069 B2
(45) Date of Patent: *Dec. 24, 2019

(54) UTILIZATION OF A CONCEPT TO OBTAIN DATA OF SPECIFIC INTEREST TO A USER FROM ONE OR MORE DATA STORAGE LOCATIONS

(71) Applicant: International Business Machines Corporation, Armonk, NY (US)

(72) Inventors: Richard W. Arnold, Austin, TX (US); Thomas P. Bishop, Austin, TX (US); Olushola O. Esho, Austin, TX (US); Jordan R. McCoy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 464 days.

This patent is subject to a terminal disclaimer.

(21) Appl. No.: 14/632,808

(22) Filed: Feb. 26, 2015

(65) Prior Publication Data

US 2015/0278286 A1    Oct. 1, 2015

Related U.S. Application Data

(63) Continuation of application No. 14/242,217, filed on Apr. 1, 2014.

(Continued)

(51) Int. Cl.
*G06F 17/30* (2006.01)
*G06F 16/23* (2019.01)
(Continued)

(52) U.S. Cl.
CPC ...... *G06F 16/2365* (2019.01); *G06F 16/1734* (2019.01); *G06F 16/21* (2019.01);
(Continued)

(58) Field of Classification Search
CPC ......... G06F 17/30321; G06F 17/30598; G06F 17/30613; G06F 2216/03; G06F 17/30864; G06F 17/30699; G06F 17/30312
(Continued)

(56) References Cited

U.S. PATENT DOCUMENTS 6,012,067 A    1/2000  Sarkar
6,219,670 B1   4/2001  Mocek et al.
(Continued)

FOREIGN PATENT DOCUMENTS

CN    102385615 A    3/2012
CN    102937970 A    2/2013
(Continued)

OTHER PUBLICATIONS

Taiwan Office Action dated Aug. 19, 2016, 6 pages.
(Continued)

*Primary Examiner* — Alexandria Y Bromell
(74) *Attorney, Agent, or Firm* — Richard Wilhelm; Edell, Shapiro & Finnan, LLC

(57) ABSTRACT

A computer-implemented method of obtaining data of interest from a larger set of data that has been indexed is provided, the method comprising defining, via a user interface of a computing device, a set of attributes associated with a concept. Each attribute associated with the concept is mapped to attributes associated with indexed data, and data of interest relevant to the concept is retrieved based upon the mapping of attributes associated with the concept to attributes associated with the indexed data.

10 Claims, 12 Drawing Sheets

Related U.S. Application Data

(60) Provisional application No. 61/866,258, filed on Aug. 15, 2013, provisional application No. 61/866,202, filed on Aug. 15, 2013.

(51) Int. Cl.
| | | |
|---|---|---|
| *G06F 16/21* | (2019.01) | |
| *G06F 16/28* | (2019.01) | |
| *G06F 16/335* | (2019.01) | |
| *G06F 16/17* | (2019.01) | |
| *G06F 16/22* | (2019.01) | |
| *G06F 16/9535* | (2019.01) | |
| *G06F 16/2457* | (2019.01) | |
| *G06F 16/9032* | (2019.01) | |

(52) U.S. Cl.
CPC .... *G06F 16/2228* (2019.01); *G06F 16/24573* (2019.01); *G06F 16/285* (2019.01); *G06F 16/335* (2019.01); *G06F 16/90332* (2019.01); *G06F 16/9535* (2019.01)

(58) Field of Classification Search
USPC ....... 707/737, 741, 754, 756, 763, 709, 711, 707/738, 776
See application file for complete search history.

(56) References Cited

U.S. PATENT DOCUMENTS

| | | | |
|---|---|---|---|
| 6,263,334 B1 | 7/2001 | Fayyad et al. | |
| 6,745,176 B2 | 6/2004 | Probed, Jr. et al. | |
| 6,826,553 B1 | 11/2004 | DaCosta et al. | |
| 6,954,758 B1 | 10/2005 | O'Flaherty | |
| 7,219,099 B2 | 5/2007 | Kuntala et al. | |
| 7,305,389 B2 | 12/2007 | Zeng | |
| 7,676,553 B1* | 3/2010 | Laucius | G06F 16/951 709/219 |
| 7,685,083 B2 | 3/2010 | Fairweather | |
| 7,702,690 B2 | 4/2010 | Brave | |
| 7,756,881 B2 | 7/2010 | Crivat | |
| 7,801,894 B1 | 9/2010 | Bone et al. | |
| 7,844,582 B1 | 11/2010 | Arbilla et al. | |
| 7,856,434 B2* | 12/2010 | Gluzman Peregrine | G06F 16/951 707/722 |
| 7,895,191 B2* | 2/2011 | Colossi | G06F 16/24542 707/717 |
| 7,930,197 B2 | 4/2011 | Ozzie | |
| 7,953,694 B2* | 5/2011 | Colossi | G06F 16/283 707/600 |
| 8,046,338 B2 | 10/2011 | Basso et al. | |
| 8,200,569 B1 | 6/2012 | Zerenner et al. | |
| 8,447,722 B1 | 5/2013 | Ahuja | |
| 2001/0056429 A1* | 12/2001 | Moore | G06F 16/00 707/707 |
| 2004/0125131 A1 | 7/2004 | Phelps | |
| 2004/0220944 A1* | 11/2004 | Behrens | G06F 17/3071 707/707 |
| 2005/0138109 A1 | 6/2005 | Redlich et al. | |
| 2005/0273667 A1 | 12/2005 | Shrivastava et al. | |
| 2005/0278708 A1* | 12/2005 | Zhao | G06F 8/20 717/136 |
| 2005/0289168 A1* | 12/2005 | Green | G06F 17/3064 707/707 |
| 2005/0289524 A1* | 12/2005 | McGinnes | G06F 8/10 717/140 |
| 2006/0161556 A1 | 7/2006 | Dettinger et al. | |
| 2007/0185904 A1 | 8/2007 | Matsuzawa et al. | |
| 2007/0214135 A1 | 9/2007 | Crivat et al. | |
| 2008/0027893 A1 | 1/2008 | Cavestro et al. | |
| 2008/0147641 A1 | 6/2008 | Leffingwell et al. | |
| 2008/0147642 A1 | 6/2008 | Leffingwell et al. | |
| 2008/0154873 A1 | 6/2008 | Redlich et al. | |
| 2008/0168135 A1 | 7/2008 | Redlich et al. | |
| 2008/0201277 A1 | 8/2008 | Ozdemir et al. | |
| 2009/0018996 A1 | 1/2009 | Hunt et al. | |
| 2009/0089078 A1 | 4/2009 | Bursey | |
| 2009/0106234 A1 | 4/2009 | Siedlecki et al. | |
| 2009/0282066 A1 | 11/2009 | Russell et al. | |
| 2010/0049766 A1 | 2/2010 | Sweeney et al. | |
| 2010/0145917 A1* | 6/2010 | Bone | G06F 16/122 707/694 |
| 2010/0179951 A1 | 7/2010 | McPhail et al. | |
| 2010/0250547 A1 | 9/2010 | Grefenstette | |
| 2010/0268700 A1* | 10/2010 | Wissner | G06F 17/30864 707/706 |
| 2010/0332454 A1 | 12/2010 | Prahlad | |
| 2010/0332475 A1 | 12/2010 | Birdwell | |
| 2011/0153686 A1 | 6/2011 | Campbell et al. | |
| 2012/0041979 A1* | 2/2012 | Lee | G06N 5/022 707/776 |
| 2012/0096041 A1 | 4/2012 | Rao et al. | |
| 2012/0131139 A1* | 5/2012 | Siripurapu | G06F 17/30864 709/217 |
| 2012/0166415 A1 | 6/2012 | Lewallen et al. | |
| 2012/0173506 A1 | 7/2012 | Wilansky et al. | |
| 2012/0209847 A1* | 8/2012 | Rangan | G06F 17/3069 707/737 |
| 2012/0214159 A1* | 8/2012 | George | G01N 35/00603 435/6.11 |
| 2012/0254134 A1 | 10/2012 | Talati et al. | |
| 2012/0323941 A1* | 12/2012 | Chkodrov | G06F 17/30516 707/756 |
| 2013/0024424 A1* | 1/2013 | Prahlad | G06F 3/0649 707/640 |
| 2013/0066921 A1* | 3/2013 | Mark | G06F 17/30734 707/794 |
| 2013/0073400 A1* | 3/2013 | Heath | G06Q 30/02 705/14.73 |
| 2013/0159310 A1* | 6/2013 | Birdwell | G06F 17/30442 707/737 |
| 2013/0204886 A1* | 8/2013 | Faith | G06Q 30/0631 707/756 |
| 2013/0218893 A1 | 8/2013 | Pai | |
| 2014/0089777 A1 | 3/2014 | Roiniotis et al. | |
| 2014/0279770 A1 | 9/2014 | Xaypanya et al. | |
| 2014/0280193 A1 | 9/2014 | Cronin | |
| 2014/0358926 A1 | 12/2014 | McGregor et al. | |
| 2015/0019559 A1* | 1/2015 | Maquaire | G06F 16/907 707/740 |
| 2015/0052158 A1 | 2/2015 | Bishop et al. | |
| 2015/0052162 A1 | 2/2015 | Arnold et al. | |
| 2015/0095340 A1 | 4/2015 | Bishop et al. | |
| 2015/0149491 A1 | 5/2015 | Redlich | |
| 2015/0278340 A1 | 10/2015 | Bishop et al. | |
| 2017/0092292 A1* | 3/2017 | Watts | G10L 21/043 707/707 |
| 2017/0235848 A1* | 8/2017 | Van Dusen | H04L 41/04 705/12 |
| 2017/0364546 A9 | 12/2017 | Bishop | |
| 2018/0083779 A1 | 3/2018 | Malone | |

FOREIGN PATENT DOCUMENTS

| | | |
|---|---|---|
| CN | 102955848 | 3/2013 |
| CN | 102968495 | 3/2013 |
| EP | 2474935 | 7/2012 |
| GB | 2338324 | 12/1999 |
| WO | 03065179 | 8/2003 |
| WO | 2005038689 | 4/2005 |

OTHER PUBLICATIONS

Taiwan Search Report dated Aug. 19, 2016, 1 page.
PCT International Search Report and Written Opinion, PCT/CN2014/084172, dated Nov. 15, 2014, 12 pages.
PCT International Search Report and Written Opinion, PCT/CN2014/084211, dated Nov. 18, 2014, 11 pages.

(56) References Cited

OTHER PUBLICATIONS

EMC Corp., EMC Captiva: Intelligent Enterprise Capture, http://web.emc.com/emc-captiva-capture?cmp=knc-IIG_Divisional-Captiva-DocIndex-INT&activity_id=218623&division=iig, accessed Aug. 7, 2013, 1 page.
StoredIQ, IQ Platform, http://www.storediq.com/applications/platform, accessed Aug. 9, 2013, 4 pages.
Chinese Office Action dated Jul. 30, 2019 for Chinese Patent Application No. 201480045064.1, 9 pages.

* cited by examiner

FIG.12

Add Identity

First Name
[ Jozsef ]
Last Name
[ Szalay ]
E-mail Address
[ fake_email@us.ibm.com ]
Company
[ IBM ]
Department
[ StorediQ Development ]
Owner ID
[ jszalayl ]

Cancel    Save

FIG. 13

UTILIZATION OF A CONCEPT TO OBTAIN DATA OF SPECIFIC INTEREST TO A USER FROM ONE OR MORE DATA STORAGE LOCATIONS

CROSS-REFERENCE TO RELATED APPLICATIONS

This application is a continuation of U.S. patent application Ser. No. 14/242,217, entitled "UTILIZATION OF A CONCEPT TO OBTAIN DATA OF SPECIFIC INTEREST TO A USER FROM ONE OR MORE DATA STORAGE LOCATIONS", filed Apr. 1, 2014; claims the benefit of U.S. Provisional Patent Application No. 61/866,202, filed on Aug. 15, 2013; and claims the benefit of U.S. Provisional Patent Application No. 61/866,258, filed on Aug. 15, 2013; each of which is incorporated herein by reference in its entirety.

BACKGROUND

1. Technical Field

Present invention embodiments relate to data management, and in particular to providing a mechanism to index and retrieve data managed within one or more data repositories in order to provide the data with a desired level of detail and based upon user preferences.

2. Discussion of the Related Art

Legal documents, documents that may need to be preserved due to legal holds or containing answers to Attorney questions, as well as business or regulatory documents are example market segments for which many businesses need data mining and control assistance. Since the volume of digital data that companies generate is growing at a significant rate (e.g., 60%-120%) annually, there is tremendous pressure on Information Technology (IT) executives and personnel to control costs associated with managing the data. The desired cost goals may be achieved with an understanding of the types of data being managed, the data needing to be preserved, and the data that can safely and permanently be deleted.

In addition, it is difficult to efficiently access data and information about the data (or metadata) for a particular purpose given the large amounts of data within the repositories. In particular, one user may have a need to access a specific subset of data that is different from the needs of another user (e.g., a user may need to find documents that belong to Fred but not to Jane). The user may be required to manually translate a business concept (e.g., identity, department, vendor, etc.) into filters and other tools needed to access the specific type of data (or metadata) required for the business concept, which can be a tedious and inefficient process.

SUMMARY

According to one embodiment of the present invention, a computer-implemented method of obtaining data of interest from a larger set of data that has been indexed is provided, the method comprising defining, via a user interface of a computing device, a set of attributes associated with a concept. Each attribute associated with the concept is mapped to attributes associated with indexed data, and data of interest relevant to the concept is retrieved based upon the mapping of attributes associated with the concept to attributes associated with the indexed data.

BRIEF DESCRIPTION OF THE SEVERAL VIEWS OF THE DRAWINGS

Generally, like reference numerals in the various figures are utilized to designate like components.

FIGS. 11-13 provide schematic illustrations of example graphical user interface screens for selection and use of a concept according to an embodiment of the present invention.

DETAILED DESCRIPTION

Figure 1:
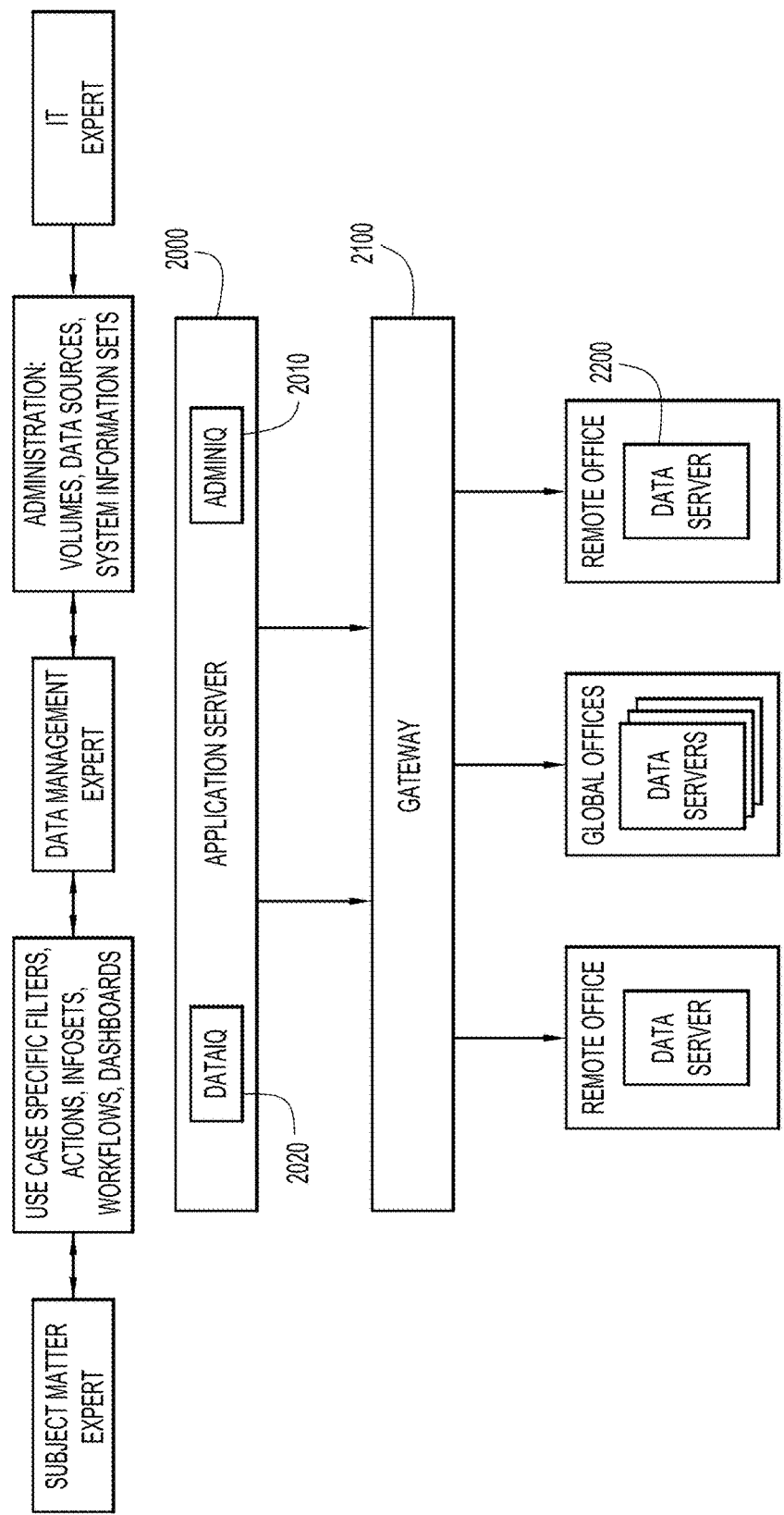
FIG. 1 is a diagrammatic illustration of an example computing environment of an embodiment of the present invention.
Figure 2:
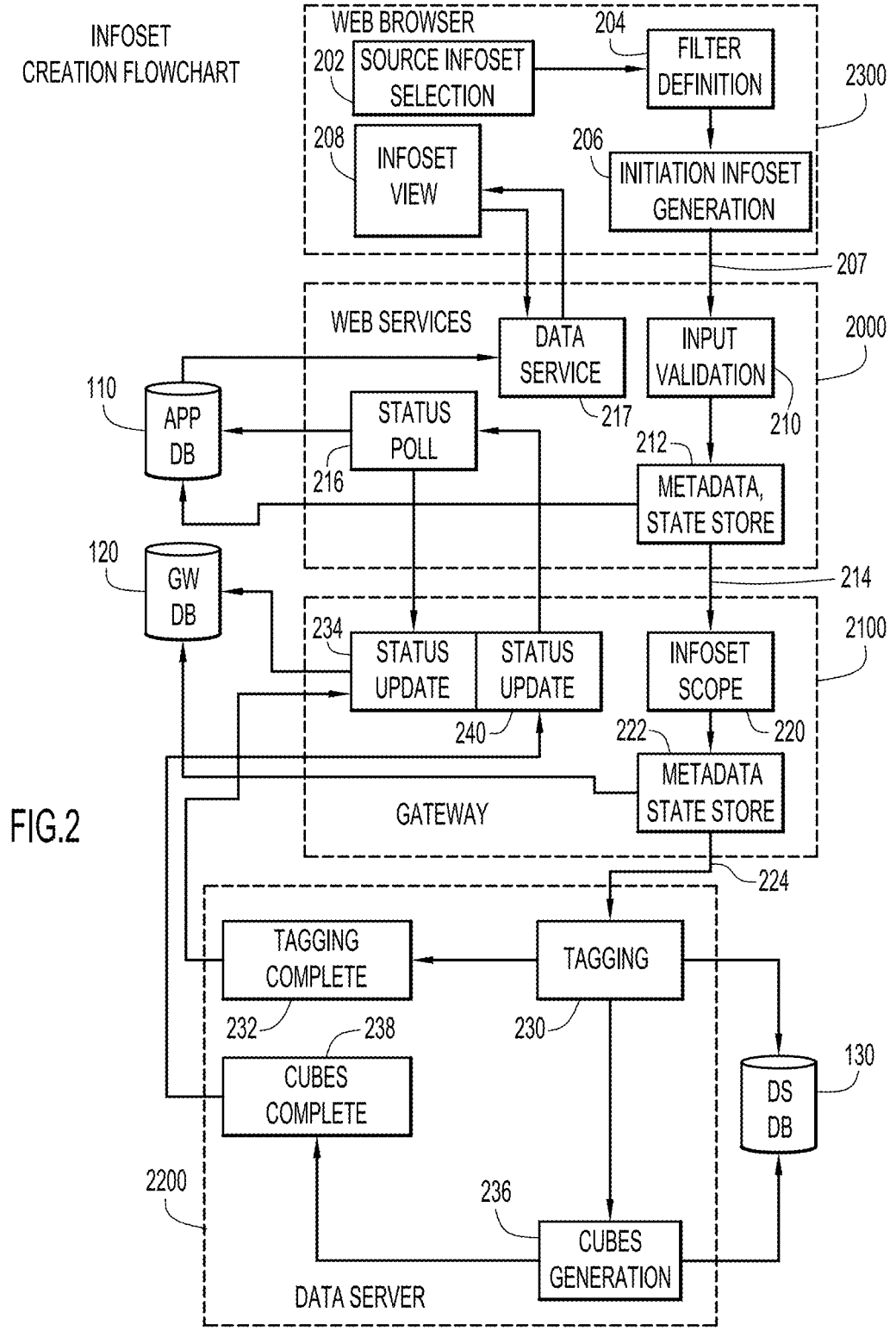
FIG. 2 is a flow diagram of an example manner of creating an information set according to an embodiment of the present invention.
Figure 3:
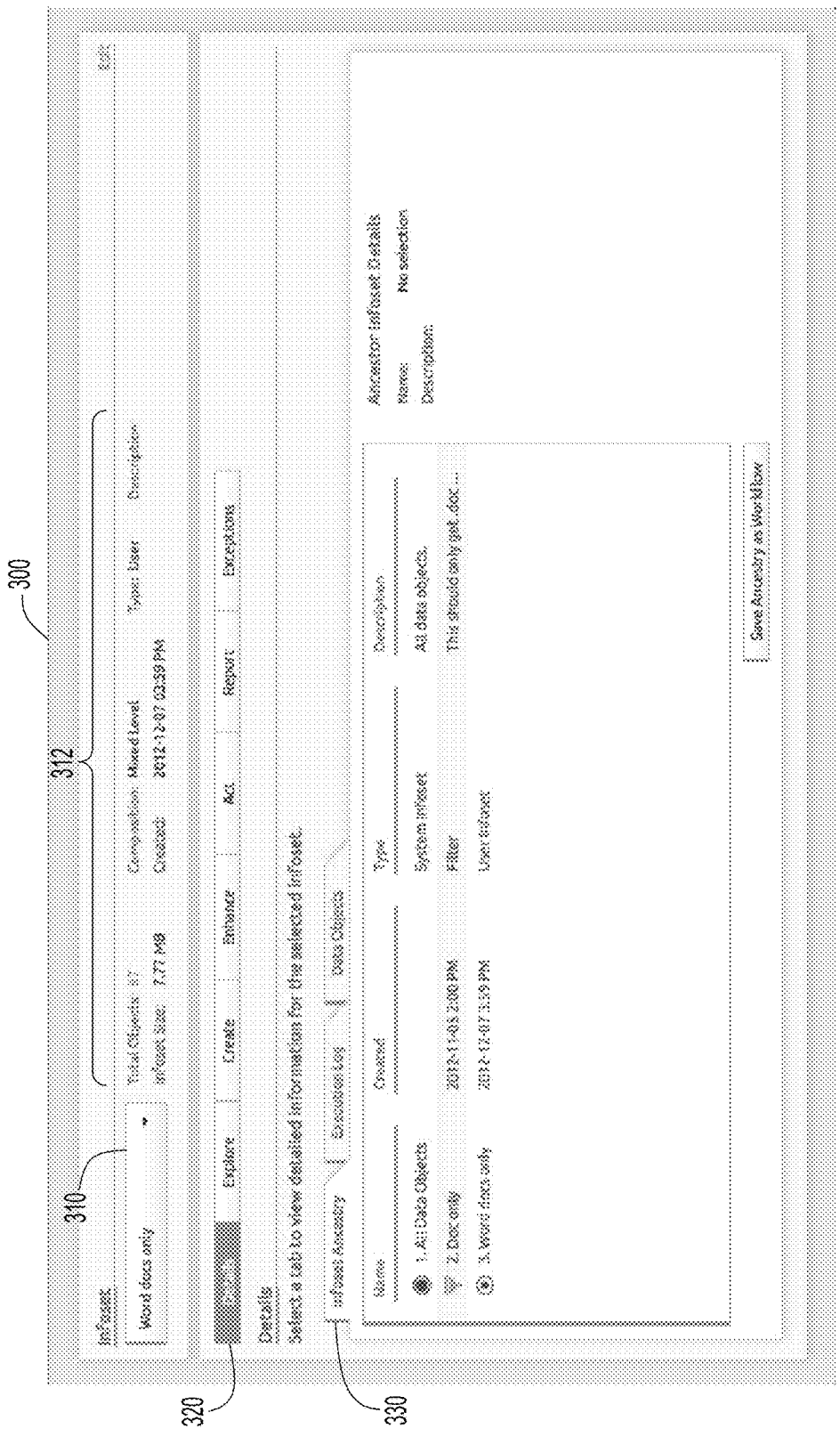
FIG. 3 is a schematic illustration of an example graphical user interface screen for selecting a source information set according to an embodiment of the present invention.
Figure 4:
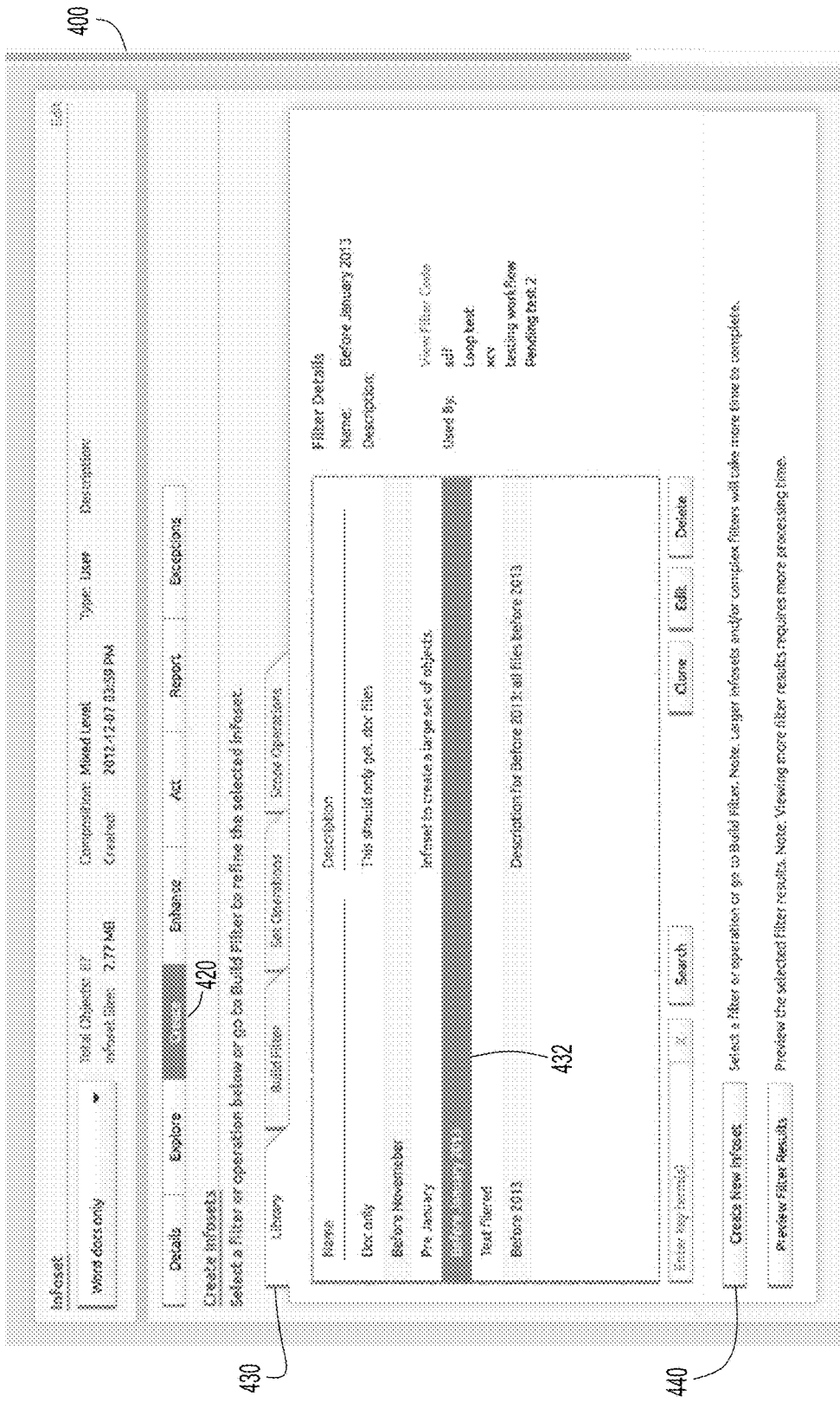
FIG. 4 is a schematic illustration of an example graphical user interface screen for selecting a filter for creating an information set from a source information set according to an embodiment of the present invention.
Figure 5:
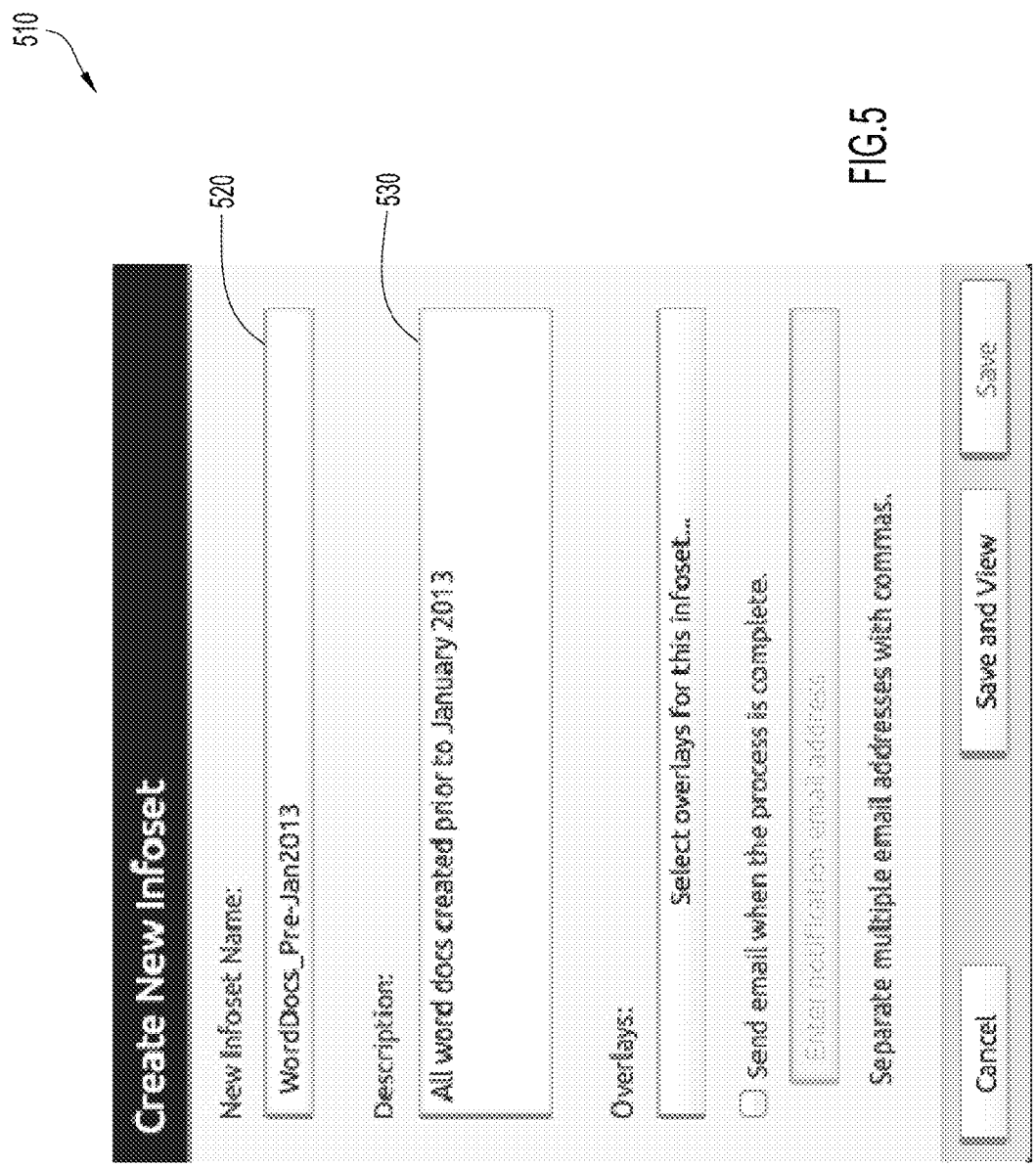
FIG. 5 is a schematic illustration of an example graphical user interface screen for entering a name and other metadata for an information set according to an embodiment of the present invention.

Present invention embodiments pertain to management of data within various data repositories, while allowing the data to be left intact on those repositories. Information about the data (or metadata) is extracted and inserted into an index stored separately from the data of the data repositories.

Present invention embodiments include a framework for retrieving information and metadata from the data repositories. The individual data repositories are accessed via adaptors with authentication to retrieve and, in certain instances, change the data. A user may provide their own rules for defining an information set (or subset of the managed data) to include information of interest to the user, and indicate a reference to the defined information set, thereby allowing for access rules across different access methods and different repositories. For example, a user may be interested in data stored in a UNIX file system and a WINDOWS file system.

The user may name and save an information set with the desired resulting data in order to later access that data.

The data within an information set is established by applying filters to the managed data that are based on collected information. This collected information provides a level of understanding that enables users to identify data that is specific to or interesting for a use case.

Present invention embodiments further enable collection of specific data for making decisions or performing tasks without having to understand the details regarding the underlying specific placement of data and methods to access the data. In particular, present invention embodiments may generate an information set utilizing concepts, as described in further detail herein, that define and represent classes or types of information that represent one or more business objects that are of interest to a user. The concept is defined by a set of attributes that describe and distinguish constituents of the concept, and the attributes are mapped to attributes of indexed data obtained from data harvesting of one or more data repositories. Constituents are also associated with the defined concept, and a creation of an information set is implemented utilizing the defined concept and associated constituents.

Present invention embodiments can ensure efficiency, where costly or time-consuming operations are only performed when necessary and only to a specified subset of the total data under management. For example, Information Technology (IT) personnel may start by harvesting only system metadata from file, email, collaboration, or other servers. The harvested information includes one or more indexes associated with the information, which is used to map attributes of a defined concept to attributes within the indexes so as to allow a user to access data within an information set that corresponds with a particular concept.

Present invention embodiments provide several advantages including, without limitation: an external user is able to define the meaning of a concept as it applies to their particular scenario or situation (i.e. use case); defining a concept in accordance with the present invention provides a way for the user to retrieve information about data without needing to know the details of how and where the data is originally stored; and the defined concepts facilitate the execution of complex queries against indexed data (from the data harvesting), thus reducing storage and the time to retrieve answers to specific queries (as well as shielding the user from complexities associated with the concept).

Example embodiments are initially described herein showing how information sets can be generated utilizing an example system architecture (as depicted in FIG. 1). Next, example embodiments for defining and utilizing concepts for accessing data within data repositories is described in the context of obtaining information sets. However, is it noted that the present invention is not limited to such example embodiments, since the use of a concept as described herein to obtain data relating to the concept from data repositories can also be implemented utilizing other suitable techniques.

An example environment for use with present invention embodiments is illustrated in FIG. 1. The environment provides data management for data that remains intact within data repositories. Specifically, the environment includes an application server system (or application stack) 2000, a gateway system 2100, one or more data server systems 2200, and one or more client or end-user systems to enable users and/or administrators to access the various data management services. The application server system, gateway system, data server systems, and client systems may be remote from each other and communicate over a network.

The network may be implemented by any number of any suitable communications media (e.g., wide area network (WAN), local area network (LAN), Internet, Intranet, etc.). Alternatively, these systems may be local to each other, and communicate via any appropriate local communication medium (e.g., local area network (LAN), hardwire, wireless link, Intranet, etc.).

The application server system (or application stack) provides the backbone for a browser-based graphical user interface (GUI), and holds and provides information (e.g., metadata, state information, etc.) about application objects. The application server includes an administration component 2010 and a data component 2020. The administration component provides various administration tasks (e.g., configuration of volumes, data sources, system information sets, use case specific filters, actions, information sets, workflows, dashboards, etc.). These tasks may be performed by various users (e.g., Information Technology (IT), data management, and subject matter experts, etc.). The data component provides data management tasks for end-users (e.g., creation of information sets, performance of data expansion, etc.).

Gateway system 2100 serves as a gateway between application server system (or application stack) 2000 and data server systems 2200, and relays commands from the application server system to the data server systems. The data server systems register with and connect to the gateway system, where the gateway system maintains up-to-date information about the registered and connected data server systems. The gateway system further holds additional, and in some cases, more detailed metadata and status information about application-level objects, and also maintains certain types of data that are aggregated from the data server systems.

One or more data server systems 2200 may reside at various local or remote locations (e.g., remote offices, global offices, etc.) to access data of a customer or consumer of the data management services. The data server systems may be scaled out horizontally to meet processing needs. The data server systems have connectors to many types of customer or consumer data sources where their data resides. These connectors have the ability to interrogate, to harvest and, in certain cases, to modify the content of the data sources. Further, each data server maintains an index for whatever it has collected from the customer data servers that were assigned to the data server systems. The data server systems perform the bulk of processing and computation in terms of collecting data, executing actions, performing searches, and deeper data analysis. Thus, the data server systems provide access to customer or consumer data to enable management of that data while the customer data remains intact within the customer data repositories or server systems.

Application server system 2000, gateway system 2100, data server systems 2200 and the client systems may be implemented by any conventional or other computer systems preferably equipped with a display or monitor, a base (e.g., including at least one processor, one or more memories and/or internal or external network interfaces or communications devices (e.g., modem, network cards, etc.)), optional input devices (e.g., a keyboard, mouse or other input device), and any commercially available and custom software (e.g., server/communications software, data and administration components, browser/interface software, etc.). These systems may include one or more modules or units to perform the various functions of present invention embodiments described below. The various modules may be implemented by any combination of any quantity of software and/or hardware modules or units, and may reside within memory of the application server, gateway, data server and/or client systems for execution by a system processor.

Information sets provide a virtual data "container" for data that has been indexed by data server systems 2200. For example, an information set may have the form of a list of references or handles to records included in the index. An information set may represent some or all of that data, and may be immutable. A user may derive a new information set from another information set based on specific selection criteria to filter the other information set's content. Information sets may be used, and reused, to perform a wide variety of operations against that data (e.g., copying the data, deleting the data, etc.). As the underlying indexes are updated or recreated, new information sets may be created to reflect those changes. Thus, information sets may provide "snapshots" of user's data in time.

A user interface (UI) may allow a user to define rules for criteria (e.g., specifying an identity, department, organization, vendor, product, custodian, object properties, attributes, etc.) to encapsulate indexed data, create an information set of the indexed data meeting the criteria, adjust the criteria to form a new information set, perform set operations (e.g., comparison, identifying changes, union, intersection, complement, symmetric difference, etc.) on information sets, present reports of the results of the operations, and convert the criteria to adaptors with filters to retrieve the data satisfying the criteria.

Information sets are created by applying the user defined criteria into a search expression for the entire index or at least a subset of the index, and tagging each object meeting the criteria with an information set identification. In addition, a list or table of the objects meeting the criteria is also created and stored. Subsequent usage provides quick access to the data through the previously stored list. In other words, an information set may be thought of as a table of references to the objects in the index. In one embodiment, each object in an index has an object id and the information set table has a list of object ids. The object id could be monotonically assigned integers, an initial allocation pointer, or any other way of providing a unique identification.

A manner of creating an information set from a source information set according to an embodiment of the present invention is illustrated in FIGS. 2-5. Initially, at step 202, a user selects a source information set via a browser-based graphical user interface screen 300 (FIG. 3) provided by a web browser of a client system 2300. For example, user interface screen 300 may include drop-down list control 310 for selecting an information set by name. A user may generate a new information set from all data objects (e.g., by selecting the system information set of all data objects as the source information set), or create a new information set from a previously generated information set.

User interface screen 300 may further include summary information 312 (e.g., total number of objects in the information set, size of the information set in megabytes, data and time created, description, etc.), "Details" radio-button option 320 to enable a user to view details (e.g., ancestry, execution log, data objects) of the selected information set, and other information and/or controls. For example, the user may review ancestry 330 of an information set named "Word does only" to see that the information set was created from a system-provided information set containing all data objects by selecting files with a ".doc", ".docx", or any other suitable extension indicating a word document from that system-provided information set.

At step 204, the user selects a filter to further narrow down the content of the source information set. For example, the user may select the "Create" radio-button option 420 of screen 400 (FIG. 4) to display a library 430 of existing filters and choose filter 432 for selecting files created before January, 2013. The user may choose to create a new information set using the selected source and filter by actuating the "Create New Infoset" button 440.

At step 206, the user names the new information set and initiates its generation. For example, the user may enter a name in text box 520 of dialog screen 510 (FIG. 5) and may enter other metadata for the information set, e.g., a description using text box 530. Generation of the information set is initiated when the user saves this information. In particular, the browser of client system 2300 communicates the user input defining the new data set to web services of application server system 2000 at step 207. At step 208, the user may monitor the progress towards generating the information set by selecting the new information set using screen 300 and periodically refreshing the screen to view, e.g., summary information 312, state information, history of events, actions available, etc.

At step 210, web services of application server 2000 validates the user input and reports any errors to the browser of client system 2300. The web services of application server 2000 stores metadata and state information in its database, application server database 110, at step 212. At step 214, the web services of application server 2000 instruct gateway 2100 to start creating the information set. Web services of application server 2000 also initiates status polling for the information set being created in order to learn about any change in the processing and final states at step 216.

At step 220, gateway 2100 determines the scope of the work to be performed. In particular, gateway 2100 determines which data servers 2200 will participate in performing the work. This may be determined using metadata of the source information set (e.g., where the source data resides). At step 222, the gateway stores metadata of the new information set and prepares detailed state information for the participating data servers 2200 in its own database, gateway database 120. At step 224, the gateway instructs each participating data server to start the information set creation. The data servers may perform their assigned work concurrently and independently from each other.

At step 230, data servers 2200 tag objects that will belong to the new information set. In particular, the data servers generate and store in data server database 130 references to objects that are members of the source information set and that also satisfy the filter expression. The data servers determine membership based on information stored in their indexes. Thus, the data sources where the users' actual data reside are not accessed during the process of creating the new information set. The data servers may divide the membership generation into smaller tasks that can run in parallel for efficiency.

Data servers 2200 notify gateway 2100 at step 232 each time one of the smaller tagging tasks completes. The gateway receives these notifications at step 234. In response, the gateway updates the detailed state information of the new information set in gateway database 120. This updated state information is then sent to web services of application server 2000 when the web services requests an update at step 216.

Data servers 2200 generate and store aggregated information about the content of the new information set in data server database 130 at step 236. This information may be stored in, e.g., multidimensional data structures (referred to herein as a cube). The data servers may divide cube generation into smaller tasks that can run in parallel for efficiency. The data servers notify gateway 2100 each time when a smaller cube generation task is complete at step 238. The gateway receives these notifications at step 240 and updates the information set's detailed state information in gateway database 120. This updated state information is then sent to the web services of application server 2000 when the web services ask for an update at step 216.

The information set generation is considered complete when every smaller task on every participating data server is finished, and the state information is updated at the gateway and at the application server levels.

Figure 6:
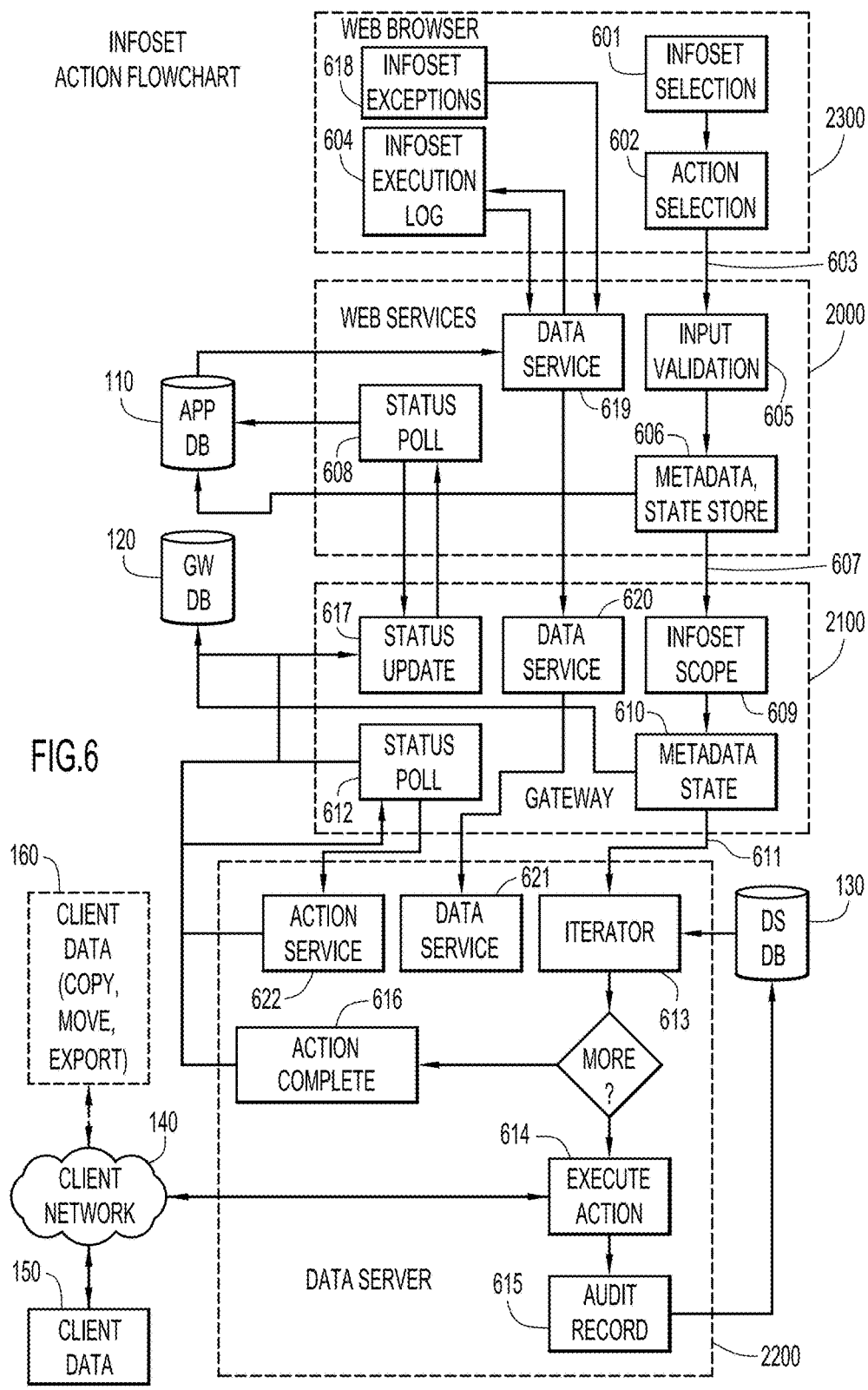
FIG. 6 is a flow diagram of an example manner of applying an operation against data designated by an information set according to an embodiment of the present invention.
Figure 7:
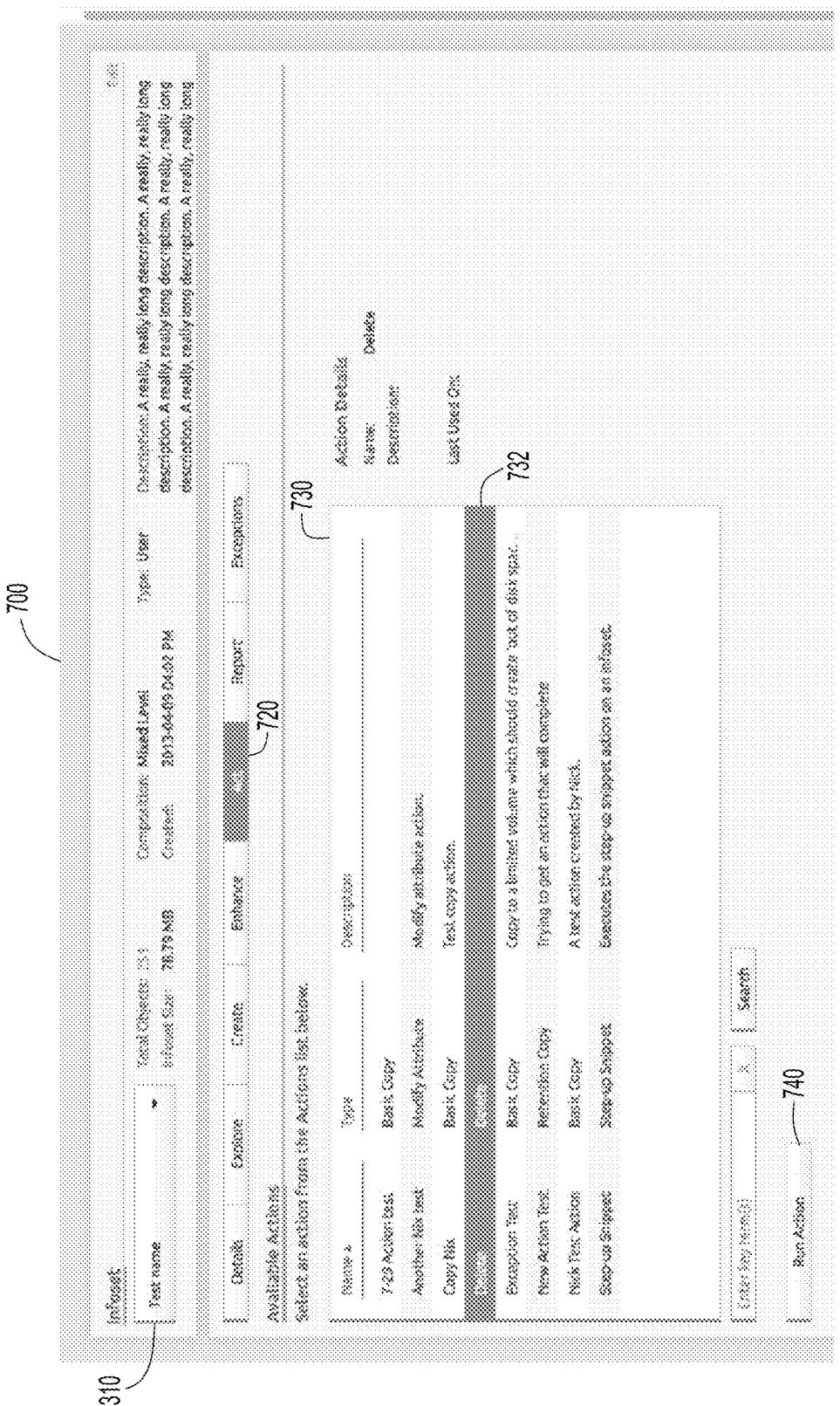
FIG. 7 is a schematic illustration of an example graphical user interface screen for selecting an operation to apply against data designated by an information set according to an embodiment of the present invention.

A manner of applying an operation against data designated by an information set according to an embodiment of the present invention is illustrated in FIGS. 6 and 7. Initially, at step 601, a user selects an information set via a browser-based graphical user interface screen 700 (FIG. 7) provided by a web browser of a client system 2300. For example, user interface screen 700 may include drop-down list control 310 for selecting an information set by name. User interface screen 700 may further include "Act" radio-button option 720 to present list box 730 of predefined actions to apply. At step 602, the user selects the desired action (e.g., delete, export, move, copy, etc.). For example, the user may select delete operation 732 from list box 730. Users may define custom actions, e.g., using an action creation/editing interface. At step 603, the user initiates the action by actuating "Run Action" button 740. In one embodiment, the user confirms his or her intention to execute the action in an additional step (e.g., in response to a pop-up dialog box). The user may monitor the state of the action at 604 by periodically refreshing a view of the execution log in the browser.

At step 605, web services of application server 2000 validate the user input, and report any errors to the web client of client system 2300. At step 606, web services of application server 2000 store metadata and brief state information in application server database 110. At step 607, web services of application server 2000 instruct gateway 2100 to start execution of the specified action. At step 608, web services of application server 2000 initiate status polling for the action being executed in order to learn when the action is completed.

At step 609, gateway 2100 determines the scope of the work by identifying the specific data servers of data servers 2200 that will actually have to do the work. Available membership information of the information set is used for this purpose. At step 610, the gateway stores metadata and state information about the action in its gateway database 120. At step 611, the gateway instructs each participating data server to start the execution of the action. The data servers may perform their assigned work concurrently and independently from each other. At step 612, the gateway also initiates a polling process in order to detect any fatal condition (e.g. power loss) at the data servers.

At step 613, the data servers create an iterator for the members of the specified information set by reading membership tags and additional parameters from its database, data server database 130. The iteration process receives parameters identifying an operation to be performed. When requesting a next item, items which already have the operation performed are by-passed and the next one needing the operation is returned. The data servers execute the specified action against each member object of the information set at step 614. Applying the actions requires the data servers to mount the servers on which the customer's data 150 resides (and/or should be transferred) via client network 140, and—based on the type of action—copy, delete, move, or export the affected objects at operation 160. The data servers may employ multiple processes to carry out the action on multiple objects simultaneously. The results of the action on member objects are written as audit records into data server database 130 at step 615. The data servers notify the gateway at step 616 when the processing of the final object of the information set is complete.

The gateway receives this notification and updates the action's state information in gateway database 120 at step 617. This updated state information is then fed to the web services of application server 2000 when the web services ask for an update at step 608.

The action is considered complete when every participating data server is finished (or has stopped responding), and the state information is updated at the gateway and at the web services levels.

The user can view the details of exceptions of selected types via an "Exceptions View" of the information set at step 618. Web services of application server 2000 ask the gateway to return the requested types of exceptions and details of the failed objects at step 619. At step 620, the gateway fetches the requested information. The gateway retrieves the requested information from its local gateway database 120 in case the information has already been cached there. Otherwise, the gateway asks the data servers that participated in the execution of that action to provide the information, in which case the participating data servers identify and return the requested exceptions and details based on the audit records in data server database 130, at step 621.

One way in which an information set can be generated is based upon a concept that is defined by a user and thus specific to that user's needs for data from one or more data repositories. A concept is defined by the user, utilizing a suitable GUI, to represent a class or type of data of interest to the user, such as an identity (e.g., an employee), a department, an organization, a vendor, a product, a project, a custodian, etc. For example, the user may define a concept based upon employees for one or more particular companies or other business entities, custodians of data, vendors associated with one or more business entities, projects associated with one or more business entities, etc. The concept is defined based upon a set of attributes associated with the concept. For example, a concept for employees of a company may have attributes associated with the concept such as a username, first name, last name, employee ID, employee email address, etc. The attributes defining the concept describe and distinguish individual constituents of the concept (e.g., individual employees of an employee concept). The defined concept and its attributes are saved in a suitable location (e.g., in the data component 2020 or other suitable storage location of the application server system 2000). The application server system 2000 can support any suitable number of different concepts for different users, where concepts can be created/generated by users (e.g., via a suitable GUI) and/or predefined within the data component 2020.

After generation of a concept, constituents can be defined and associated with the concept to limit the searching for data associated with the concept based upon the constituents. In the example embodiment of an employee concept, constituents may be an active directory of employees for one or more particular companies or other business entities of interest to the user, where the active directory can be imported from an external source (e.g., a data repository associated with the business entities of interest) or obtained in any other suitable manner (e.g., by defining an iterator that iterates through employee data to generate a set of employees). The defined constituents for a concept can be collected into groups for aggregate use by the user in searching for data associated with the concept.

The defined and stored concept is used to identify data of interest at one or more repositories, where the data is maintained at the repositories (each with its own access interface). In a use case scenario, a user defines or selects a concept (using the GUI associated with the user), identifies constituents and a mapping. A data repository (e.g., data storage for employees of a company) defines rules to use to access specific data. There may be a large corpus of data records at the repository, including word processing documents, email, files, directories, etc. The user supplied rules, based upon the attributes of the concept and the identified constituents, can be mapped to indexed data of the repository. Information relating to the indexed data can be retrieved using queries and filters (e.g., data ranges, types of data, etc.).

This allows different users to provide different definitions for their concepts to retrieve data of specific interest to such users. For example, different customers may have different definitions for employees and custodians. The information for definitions may be included in a specific format in documents (e.g., a word document may include a specific entry that identifies an employee or vendor associated with the document). By allowing a customer to generate a concept as described herein, the customer can define information that is specific to how its company operates, and queries can then be run for accessing the data from data repositories associated with the company based upon the concept that classifies information unique to the company's format.

The identified data of interest may be collected in any suitable manner from the repositories. Adaptors with filters are used to retrieve data from the repositories—the adaptors have been associated with a retrieval query utilizing the concept and one or more constituents associated with the concept.

Techniques for generating/defining a concept using attributes, mapping concepts to indexed data, selecting constituents for the concept, and utilizing the concept engine to generate information sets relating to the concept with the selected constituents is now described with reference to the flow charts of FIGS. 8-10.

Figure 8:
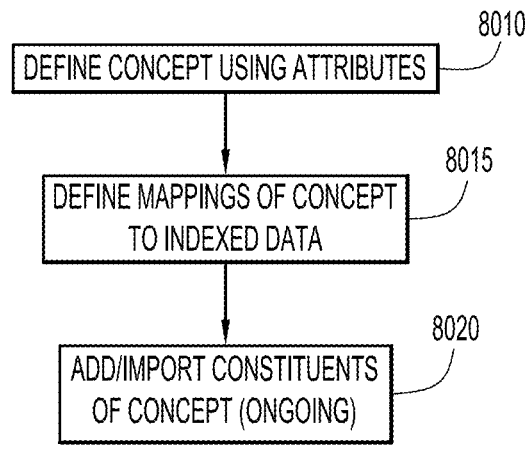
FIG. 8 is a flow diagram showing the administrative flow of generating and defining a concept for use in obtaining desired data associated with the concept from data repositories according to an embodiment of the present invention.

Referring to FIG. 8, an administrative flow describing processing steps occurring at the application server 2000 is described in which a concept is initially defined by data attributes at 8010. The concept can be predefined (e.g., one or more concepts initially loaded within the data component 2020) for selection by a user utilizing, e.g., the GUI associated with the user's client device that interacts with the application server 2000. Alternatively, the user, utilizing the GUI, can create the concept by initially defining the attributes to be associated with the concept. For example, in a scenario in which the concept is used to define employees of one or more business entities, attributes associated with the employee concept may be, e.g., a first name, a last name, an employee ID, an employee email address, etc. The defined concept with attributes can be saved (e.g., at a suitable memory location at the application server 2000) for later use by the same and/or other users. At 8015, mappings are defined for the concept to indexed data of the data repositories to be searched (e.g., indexed data obtained from the data harvesting of one or more repositories by one or more data server systems 2200). In particular, the attributes of the concept (e.g., first name, last name, etc. of an employee concept) are mapped to attributes of the indexed data. For example, first and last name attributes for an employee concept can be mapped to email fields in scenarios in which a user desires to obtain email data from one or more data repositories (e.g., map the first and last names of employees to the TO and FROM fields of email data). The mappings can be performed automatically by the application server 2000 based upon the defined concept with attributes and the indexed data.

At 8020, constituents of the concept are added or imported and saved with the concept, where such constituents can be selected by the user defining the concept. As described in relation to the process steps of FIG. 9, a user can select the constituents of interest to be applied to the concept. For example, in the scenario of an employee concept, the constituents can be one or more specified sets of employees, such as an active roster of employees from company A, or all employees from companies A, B and C that work in a particular division (e.g., as defined by employee ID), etc. The importing of constituents can be achieved by accessing suitable data storage locations that include the constituent data (e.g., a company's active roster of employees stored at the company's database). The addition or importing of constituent data can be an ongoing process in the administrative process, where it is continuously updated based upon any changes (e.g., changes in the active roster of employees for a company).

Figure 9:
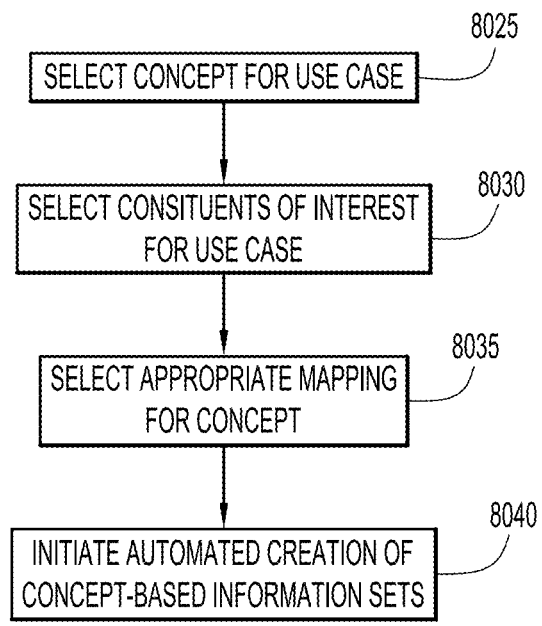
FIG. 9 is a flow diagram showing user selection of a concept to obtain the desired data from data repositories according to an embodiment of the present invention.

Referring to FIG. 9, a user flow is depicted showing process steps associated with a user selecting a concept for obtaining data of interest from one or more data repositories. At 8025, using the GUI, a user selects a concept (previously defined based upon the process steps of FIG. 8) for a use case. At 8030, the constituents of interest to the user are selected for the use case using the GUI (e.g., selection of one or more active employees from one or more particular companies).

At 8035, an appropriate mapping of attributes for the concept to attributes of the indexed data is selected using the GUI. For example, the mapping can be selected based upon a particular type of documents that the user desires (e.g., emails, word processing documents, any other types of document files), the dates in which documents are desired (e.g., emails or other documents having a sent or creation date within a specified range), etc. In the previously noted example, when emails for particular employees are desired by the user, the mapping that occurs can be the first name and/or last name of employees with the TO and FROM fields associated with emails. In this scenario, the user can select the appropriate mapping, e.g., by simply designating emails as the desired documents to be associated with the use case. At 8040, one or more information sets of data are automatically created based upon the concept, selected constituents and appropriate mapping associated with the use case.

Figure 10:
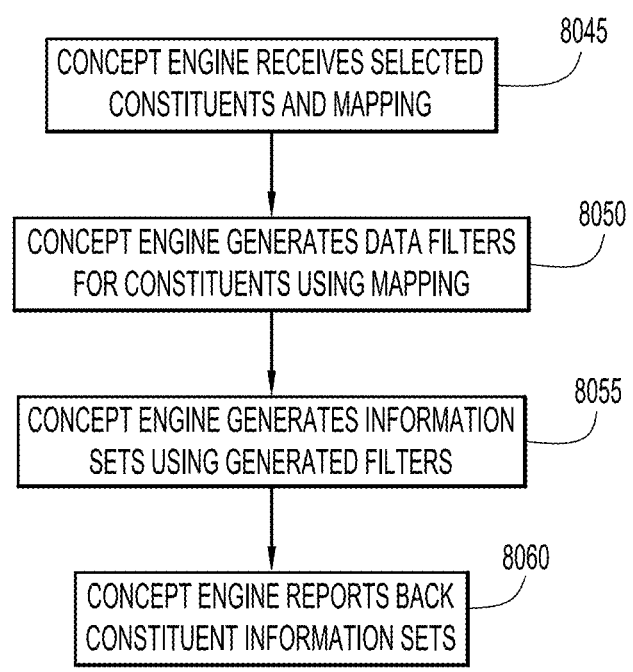
FIG. 10 is a flow diagram showing how a concept engine implemented in the computing environment of FIG. 1 implements a concept to generate one or more sets of data according to an embodiment of the present invention.

Referring to FIG. 10, process steps associated with the concept engine (e.g., provided as part of the data component 2020) are described for generating information sets based upon a use case of a concept by a user. At 8045, the concept engine receives information about the concept selected by the user (via the user's GUI) for a use case, selected constituents associated with the concept and mapping information based upon the process steps associated with the user (as depicted in FIG. 9). At 8050, the concept engine generates data filters for the constituents using the mapping. For example, in the scenario in which an employee concept is selected by a user for a use case, and the employee further selects email data to be found for particular employees, the data filters limit the searching to the TO and FROM fields of email data, where email documents associated with the particular employees are searched from one or more data repositories using the generated data filters. At 8055, one or more information sets are generated by the concept engine based upon the search of the one or more data repositories using the data filters. At 8060, the concept engine reports the one or more information sets to the user. The user can access the information sets, e.g., via the GUI associated with the user.

Figure 11:
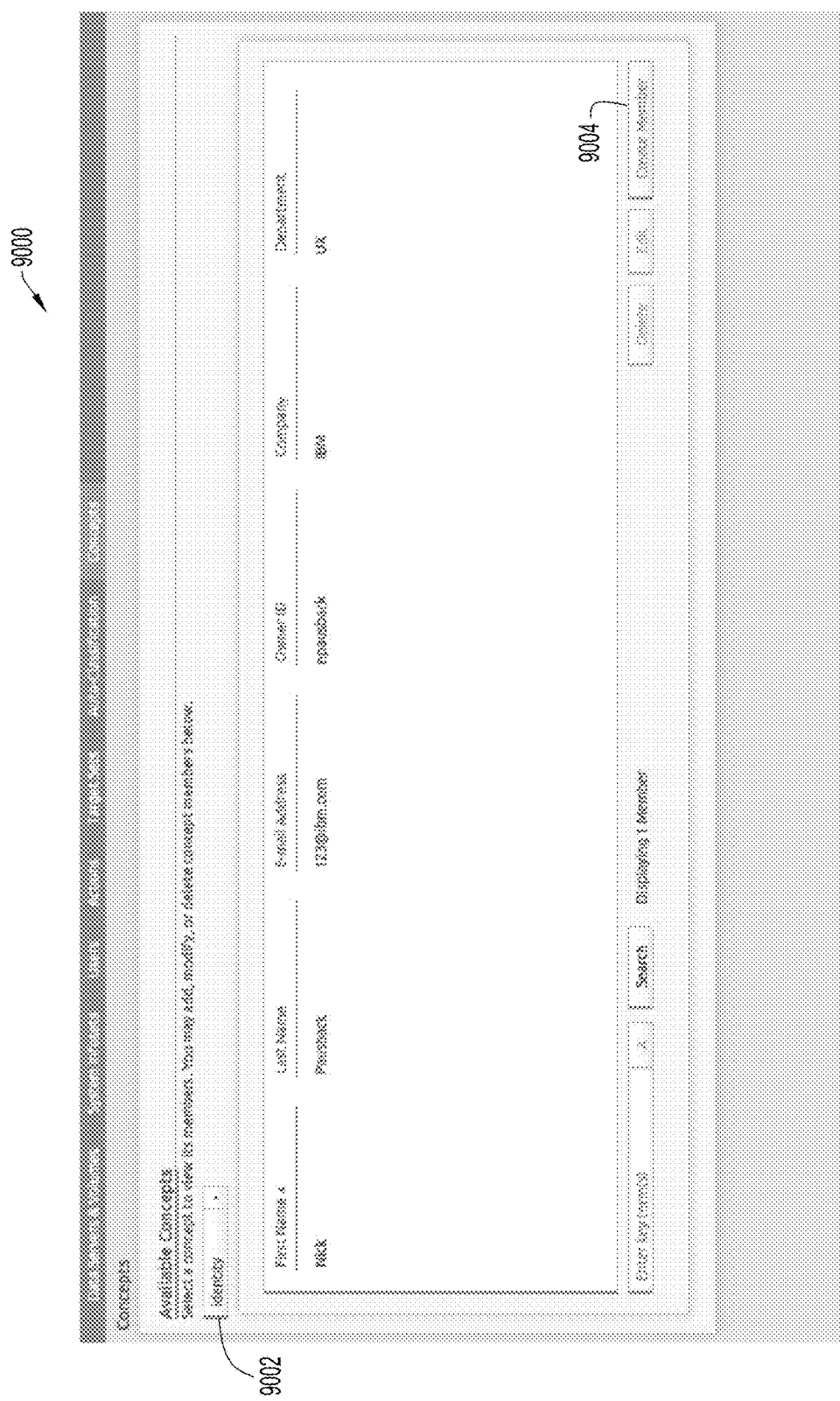
Figure 13:
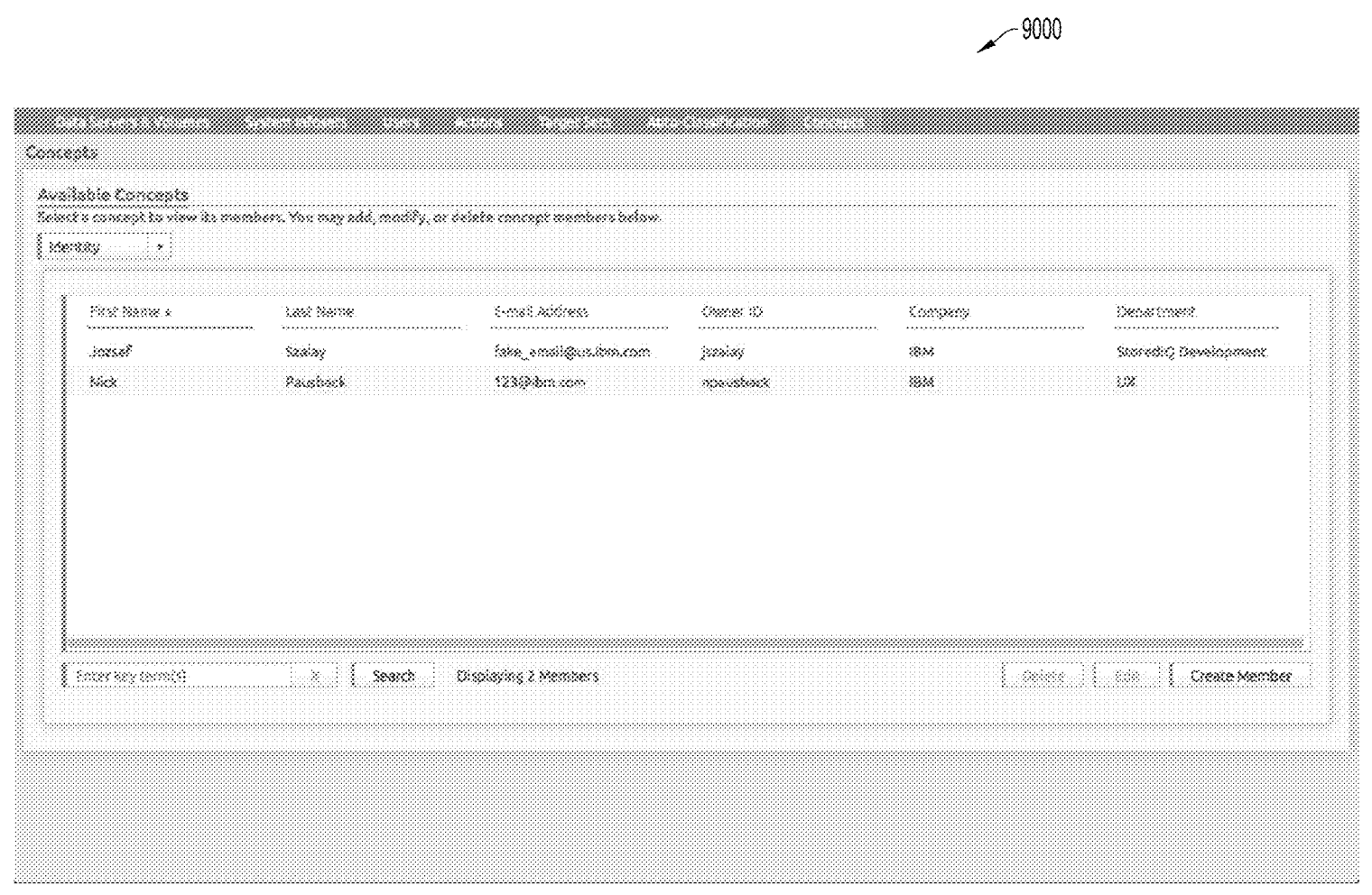

An example embodiment of a GUI that enables a user to interact with the data component 2020 (including concept engine) of the application server 2000 is now described in relation to FIGS. 11-13. Referring to FIG. 11, an IDENTITY concept is selected from pull-down menu button 9002 within GUI 9000, where the GUI 9000 is currently displaying a CONCEPTS view (other views can be selected in the menu bar at the top of the GUI). The CONCEPTS view displays a concept member including attributes associated with the concept member (first and last names, email address, owner ID, company and department). The user selects a CREATE MEMBER function (by selecting button 9004) within GUI 9000 to add another concept member to the IDENTITY concept. In response to making the CREATE MEMBER selection, a window 9006 is provided in FIG. 12 with fields in which the user can provide the attributes associated with the new concept member. Upon entering information into the fields within window 9006, the user can save this data, resulting in the addition of the new concept member to the IDENTITY concept as depicted in FIG. 13, shown at 9000. While this example embodiment facilitates manual entry of concept constituents to a specified concept, as previously noted this information can also be automatically populated for a concept (based upon imported data from a suitable data source, e.g., a selected group of employees from a company).

Thus, the example embodiments described herein facilitate efficient processing of data that is useful to a user based upon the user's specific needs by allowing the user to utilize a concept with particular attributes and constituents selected by the user to characterize and identify data that is of interest to a user for a particular use case. The mapping of the concept with associated constituents to indexed data allows for complex queries to be run against the indexed data while minimizing retrieval time of answers to the queries. In addition, the user can retrieve data from different repositories without the need to know the details of how and where the data is stored.

It will be appreciated that the embodiments described above and illustrated in the drawings represent only a few of the many ways of implementing embodiments for utilizing a concept to obtain data of specific interest to a user from one or more data storage locations.

The environment of the present invention embodiments may include any number of computer or other processing systems (e.g., client or end-user systems, gateway systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, data and administration components, etc.). These systems may include any types of monitors and input devices (e.g., keyboard, mouse, voice recognition, etc.) to enter and/or view information.

It is to be understood that the software (e.g., browser software, communications software, server software, data and administration components, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., browser software, communications software, server software, data and administration components, etc.) may be available on a non-transitory computer readable or useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., metadata, state information, attribute information, mapping information, concepts, constituents, information sets, etc.). The database system may be implemented by any number of any conventional or other databases, data stores or storage structures (e.g., files, databases, data structures, data or other repositories, etc.) to store information (e.g., metadata, state information, attribute information, mapping information, concepts, constituents, information sets, etc.). The database system may be included within or coupled to the server, gateway, and/or client systems. The database systems and/or storage structures may be remote from or local to the computer or other processing systems, and may store any desired data (e.g., metadata, state information, attribute information, mapping information, concepts, constituents, information sets, etc.).

The present invention embodiments may employ any number of any type of user interface (e.g., Graphical User Interface (GUI), command-line, prompt, etc.) for obtaining or providing information (e.g., metadata, state information, attribute information, mapping information, concepts, constituents, information sets, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or carry out combinations of special purpose hardware and computer instructions.

An embodiment of the present invention may be characterized by a method, system, and computer program product for obtaining data of interest from a larger set of data, including facilitating, via a user interface of a computing device, a user to define a concept representing a business object, in response to the user defining the concept, indexing data in accordance with the concept. The business object can comprise any type of data, including an identity, a department, an organization, a vendor, a product, a project, a custodian, etc. The concept can include attributes which define the concept. Data that is accessed in relation to the concept can be maintained in repositories each with its own access interface. The user interface can be utilized to facilitate converting of the concept to adaptors with filters to retrieve data according to a user request in relation to the concept.

What is claimed is:

1. A computer-implemented method of obtaining a set of data of interest from a larger set of data that has been indexed, the method comprising:
   at a processor of a computing device, receiving information for defining a set of attributes and mapping information;
   associating the set of attributes with a concept, the concept defining and representing a class of information that represents a business object;
   mapping each attribute associated with the concept to an attribute associated with data in an index that is generated based on data harvested from, but stored separately from, a plurality of indexed data source systems;
   automatically identifying constituents of interest based on the attributes associated with the concept and the mapping of the attributes, wherein the constituents of interest are data objects associated with the concept;
   transforming the concept by adding one or more of the constituents of interest to the concept and by generating one or more data filters for each of the one or more constituents of interest;
   updating the mapping based on at least the one or more constituents of interest;
   utilizing one or more adaptors with the one or more data filters to generate an information set relevant to the transformed concept by tagging data in the index based upon the updated mapping, without accessing an underlying indexed data source system;
   wherein the information set includes at least two members from different data source systems, and generating the information set further comprises:
      generating a list of object identifiers with each object identifier corresponding to a member of the information set and referencing a corresponding record in the index; and
      accessing data items of a plurality of different data source systems using the information set, wherein the list of object identifiers directly references indexed data to reduce access time to the data items of the different data source systems;
   each data source system determining members of the information set based on an index corresponding to that data source system, wherein the determining members includes:
      dividing the determination of members into a plurality of tasks; and
      executing the plurality of tasks in parallel to determine members with reduced processing time; and
   applying one or more operations to the information set to transform corresponding data in the underlying indexed data source systems, wherein the one or more operations include a deletion operation, a copy operation, an export operation, and a move operation.

2. The method of claim 1, wherein the concept comprises at least one of an identity, a company department, an organization, a company vendor, a product associated with a company, a project, and a custodian.

3. The method of claim 1, wherein the information set comprises a set of data comprising data records associated with one or more of the indexed data source systems that each have an access interface.

4. The method of claim 1, further comprising:
utilizing an adaptor to generate the information set, the adaptor associated with a retrieval query utilizing the transformed concept.

5. The method of claim 1, further comprising:
generating one or more data filters for the constituents of interest; and
generating the information set with the one or more generated data such that data that does not match the transformed concept is excluded from the information set.

6. The method of claim 1, further comprising:
storing the set of attributes associated with the concept;
storing the mapping of each attribute associated with the concept; and
utilizing the stored set of attributes and the stored mapping for subsequent data retrieval.

7. The method of claim 1, wherein the set of attributes is a first set of attributes, the information set is a first information set, and the method further comprises:
receiving information for defining a second set of attributes;
associating the first set of attributes with the concept;
associating the second set of attributes with the concept;
mapping the first set of attributes and the second set of attributes to attributes associated with data in the index; and
generating the first information set and a second information set relevant to the transformed concept, wherein the first information set is associated with the first set of attributes and the second information set is associated with the second set of attributes, such that the first information set and the second information set are different from each other.

8. The method of claim 7, wherein the first information set is associated with a first user and the second information set is associated with a second user, and the method further comprising:
executing a query using the first information set to direct the query to members of the first information set and produce results of interest to the first user; and
executing the query using the second information set to direct the query to members of the second information set and produce different results that are of interest to the second user.

9. The method of claim 1, further comprising:
applying an operation to the information set by:
identifying a plurality of different data source systems containing at least one member of the information set based on membership information;
assigning tasks to the identified data source systems to apply the operation to only those members of the information set residing on the identified data source systems; and
executing the assigned tasks concurrently on the on the identified data source systems to apply the operation to the information set.

10. The method of claim 1, further comprising:
executing a query against a plurality of different data source systems using the information set, wherein the mapping of attributes to indexed data reduces retrieval time of search results for the query.

* * * * *